United States Patent Office 3,255,819
Patented June 14, 1966

3,255,819
METHOD AND APPARATUS FOR IMPROVING THE BOND BETWEEN A WELL CONDUIT AND CEMENT
James B. Scott and Harry A. Wahl, Ponca City, Okla., assignors to Continental Oil Company, Ponca City, Okla., a corporation of Oklahoma
No Drawing. Filed Aug. 15, 1963, Ser. No. 302,475
4 Claims. (Cl. 166—21)

This invention relates to a method for the improved completion of subterranean wells and, more particularly, is directed to a method for providing an improved bond between the casing conduit extended into the well bore and the cement displaced about the conduit and the formation adjacent the well bore to retain the conduit in a stationary position during subsequent completion, production, and workover operations.

The production of fluids or fluidized solids from subterranean deposits is generally accomplished by drilling a well bore from the surface into communication with the subterranean location of the deposit to be recovered. As the wells are extended to greater depths, it is necessary to place a conduit, normally referred to as casing, in the well bore in order that subsequent operations, such as drilling, pumping, and the like, can be conducted within the confines and protection of casing. Since the conduit extended into such a well bore normally reaches substantial depths, it is necessary that the conduit be cemented to the adjacent subterranean formations in order to support and retain the casing in a stationary position.

The cementing of conduits within subterranean well bores is a highly developed art, particularly in the production of oil and gas; but little has been known about the effectiveness of the casing cementing operation until the relatively recent development of devices capable of logging the placement and effectiveness of the cement. There are two areas wherein the characteristics of the cementing operation are critical, the first being the interface between the cement and the adjacent formation and the second being the interface between the cement and the conduit or casing. The latter interface has recently been realized to be the most significant in controlling the effectiveness of operations directed to effecting production. The present application is directed to providing an improved cement bond between the casing and the cement in order that auxiliary techniques directed to improving the production efficiencies can be utilized to achieve the designed purposes.

There have been a number of operations developed to increase the production from subterranean formations subsequent to the cementing operation which depend for operation upon making an opening in the casing and adjacent cement, such as fracturing, formation consolidation techniques, squeezes operations for a variety of purposes, acidification, solvent washing, and the like. The openings in the casing and cement, necessary for communication between the interior of the casing conduit and the adjacent formation, are accomplished by several techniques and devices, such as explosive perforation, jet perforation, reaming or cutting of a perforation, and others. All of these operations are directed to providing a means of communication for displacing fluids into the adjacent formation or recovering fluids from the formation.

The conventional cementing operation normally utilizes a neat cement, that is, a mixture of water and a hydraulic cement, such as Portland cement, which does not include the significant amounts of aggregate materials, such as sand, though there have been usages of other modified cements, such as pozzolan and latex cements. Cements used in subterranean cementing operations are generally recognized to necessarily have such characteristics as will provide sufficient strengths in terms of compressive, tensile and shear strengths. Compressive strength is the internal strength of the rigid mass of the cement, the same normally being measured by subjecting a specimen to calibrated crushing action. Tensile strength is the resistance to parting exhibited when the cement is subjected to pulling forces. Shear strength is the resistance to parting of a cement mass to at least two oppositely disposed component forces.

Initial efforts to improve the results in cementing operations were directed to improving the compressive strength of the cement in order to avoid an assumed crushing of the cement by the conduit, thus causing release at the interface, said effort now being recognized as generally misdirected because of a lack of understanding of the problem causing cementing failures. Efforts to improve the aforementioned cements' strengths failed to eliminate the difficulties arising from inadequate cementing techniques and did not provide cementing results needed to support subsequent operations wherein the conduit was subsequently opened for communication through the cement to the formation. Use of improved logging techniques indicates that poor cement jobs are prevalent in spite of efforts to overcome the same.

The critical factor in achieving a good cementing operation is the achievement of strength of the cement bond at an interface of the casing conduit and the cement, i.e. between the unlike materials of the conduit and the cement. This bond, referred to as the hydraulic bond, is the ability of the cement to resist parting from the conduit as hydraulic pressure is applied against the cement and casing interface with the strength of the same being measured as the force necessary to cause separation or parting at said interface. The fluid injected into or recovered from the formation which channels through the separation at the interface of the cement and conduit to prevent proper placement of the fluids, indicates failure of the cement job due to the lack of adequate hydraulic bond strength.

An object of this invention is to provide an improved cementing operation for subterranean well bores by means of the present method.

Another object of this invention is to provide a cementing operation which will enable reliable completion techniques to be subsequently applied to the formation adjacent a cased well.

Another object of this invention is to provide a practical and economical method of obtaining a cement job with the requisite strengths, particularly hydraulic bond strength.

A further object of this invention is to provide a cement job with sufficient bonding characteristics to endure perforating, fracturing, acidizing, squeeze operations, secondary recovery processes, and related operations wherein resistance to hydraulic pressure is required.

Other objects and advantages of the present invention will be readily apparent and fully understood from the description of the invention hereinafter set forth.

Briefly, the present invention is an improved method of completing a subterranean well bore which comprises inserting a tubular conduit having a scabrous exterior surface into the well bore, displacing cementitious material into the annulus defined by said conduit and the surrounding subterranean formation, and closing in the well containing the same until said cement has set to a rigid mass; and particularly including as an article of manufacture a tubular conduit having a scabrous exterior surface.

The description of the article of manufacture used in the method of the invention is presented prior to the description of the method of completion in order that the method can be more readily understood. The article is a tubular conduit having the requisite characteristics of length, diameter, wall thickness, and strengths to meet the requirements for operation under the conditions for the individual well situation in which the same is to be utilized. Tubular conduit or casing for insertion into and cementing in subterranean well bores is available in forms having a variety of characteristics. Due to the depths normally involved, individual pieces of casing, referred to as joints or sections, must be coupled together as a string or casing string to obtain a conduit of sufficient length to reach such depths. For the purpose of simplifying the description of the inventive apparatus in this specification, a single joint of conduit is described, but it is to be understood that the description is applicable to any conduit regardless of size.

The article of manufacture used in the method of this invention is any tubular conduit, such as a joint of steel casing, which has had the exterior surface thereof altered in such a manner as to make the same substantially scabrous in nature. This condition is achieved by subjecting the exterior of the pipe to one or more treatments whereby the same is rendered scabrous, i.e., a roughened, irregular, and incongruous surface being characterized by substantial inconformities. The scabrous surface of a treated conduit is preferably nonuniform upon comparison of portions of a cross section taken on the axis of said conduit or comparison of two such complete, separate cross sections. This scabrous surface can be achieved by applying materials to the exterior of a joint of conduit of the desired size, or perhaps less than the desired size, by attaching materials to the exterior surface with an adhesive, by welding, or by other conventional processes; or by reducing the exterior surface of a joint of conduit of greater than the desired size, as by operations such as knurling, abrading, etching, quilting, or processing the plate material with non-smooth rollers.

Tubular conduit, as received from the mill, often has a coating of varnish thereon. The term "scabrous" as used herein is not intended to cover new, varnished conduit. In addition tubular conduit frequently is exposed to the weather before use and becomes rusted through atmospheric oxidation. Such conduit is also excluded from the scope of the term "scabrous"; however, such exclusion does not apply when the oxidized surface is caused other than through normal atmospheric oxidation. Thus, it is within the scope of the invention and the term "scabrous" to employ tubular conduit having an oxidized surface prepared by chemical means, such as by oxidation in a furnace.

The accomplishment of a scabrous exterior for improved hydraulic bond strength is effected by increasing the irregularity of the conduit surface exposed for subsequent contact with the cementitious material to be displaced thereabout. Improvement in hydraulic bond strength is directly proportional to the increase of such irregularity, provided however that the means increasing said irregularity must be affixed to the treated casing exterior in such a manner to be capable of exhibiting hydraulic bond strength significantly greater than the hydraulic bond strength between the cementitious material and the untreated casing, otherwise there is merely a shifting of the failing interface. The problem of shifting the interface failure is only encountered when irregularity is achieved by attaching solids to the exterior of casing, not as the surface area is increased by removal of a portion of the casing exterior as described above. From a practical and economical standpoint, however, the preferred approach to preparing a casing joint for use in the present invention is to apply extraneous matter to the exterior of a joint having the desired characteristics of length, diameter, wall thickness, and strength.

An article used in the method of this invention can be prepared by applying essentially any particulate solid, such as sand, rock, gravel, shell, frit, metal, metal shavings, and like, to the casing joint. The particulate solid can be attached to the casing exterior by means of an adhesive material previously applied to the casing by spraying, brushing or dipping, said adhesive being any material that will rigidly adhere said solid to the casing exterior, such as epoxy, urea formaldehyde, acrylate, phenol formaldehyde and polystyrene resins, with the preferred being epoxy resins.

The general procedure for preparing a scabrous exterior surface on a joint of conduit is to remove loose rust, scale, mill varnish, dirt and other material from the surface of the conduit. This can be done in several ways, such as by solvent washing, acid etching, sand blasting, buffing with a wire brush, or scraping. After cleaning the pipe surface, the adhesive is applied by brushing, spraying, dipping, or rolling so that the desired coating is obtained. Next, the particulate solid is applied to the coated surface. This can be accomplished by randomly sprinkling the solid on the surface or rolling the conduit in a bed of the solid. The adhesive material preferred is the epoxy resin. This material will generally contain a catalyst or curing agent to speed up the setting time. Usually a period of 6–8 hours is needed to set the adhesive; however this time can be either increased or decreased depending on the amount of catalyst added or the temperature of the conduit when the adhesive is applied. The exterior coating on the conduit can be applied either on location in the field or in a processing plant. After the coating has set sufficiently, weather or continued aging is not critical. Conduit can be prepared quite some time before actual use in the field without any detrimental effects.

The particulate matter applied to the casing exterior, substantially any solid material, must have general size limitations so that the minimum size is sufficient to protrude outwardly from the adhesive coating and the maximum size is capable of being rigidly emplaced by the adhesive material. The solids preferably have a variety of configuration and size distribution for optimum results, but nonuniformity of configuration and size is not critical from the practical standpoint. The size of the particulate solid within the above general limitations which is preferred is the range from six (6) through forty (40) mesh, all sieve sizes herein being U.S. series. The frequency of the particule distribution over the area of the casing exterior is expressed herein as areal distribution with higher areal distribution indicating a greater amount of solid per area. The placement of particulate solid, regardless of frequency, is to be as uniform as practical over the casing exterior, while within limits the criticality of the degree of particle size and configuration is inversely proportional to the areal distribution. Improvement in the hydraulic bond strength is obtained if the irregularity for the scabrous surface is increased by a fractional percent of areal distribution and the areal distribution can be one hundred (100) percent with even more particles than are needed to cover one hundred (100) percent being possible if particles are not in a monolayer. The preferred range of areal distribution is from about five (5) to about seventy (70) percent.

Prior to conducting a series of field tests of the present method and apparatus, several series of experimental tests, set forth in Tables I through III, were conducted in laboratory facilities. In these tests, certain terms are used to describe the surface condition of the exterior surface of the tubular conduit or section thereof as follows: "new" means conduits as received from a mill with coating of varnish thereon; "clean" means conduit cleaned of any varnish, oxidized material, mud, or other foreign matter; and "rusty" means conduit highly oxidized by extensive weathering. The terms applied to the surface coating of the exterior of the casing herein are as follows: "aluminized" means conduit having aluminum particles fused thereon; "epoxy-sand" means conduit having a coating of epoxy resin in which sand has been emplaced; and "acid etched" means conduit subjected to acid contact for etching of the surface thereof.

Prior to conducting several field tests of the present method and apparatus, a series of experimental tests were conducted in laboratory facilities designed to approximate actual conditions pertinent to measurement of hydraulic bond strength as nearly as feasible.

EXAMPLE 1

Specimens of casing conduit were prepared by cutting a piece of conventional steel casing 8 inches in length and 4½ inches in outside diameter parallel to the axis to form two semicircular specimens. Each specimen was drilled to provide a centered bore hole in the specimen which was threaded to receive a hydraulic connection, and a uniform plug of removable putty generally in the shape of a watch glass was placed over the exterior of the hole to simulate a crack or cavity as would be formed during a perforating operation. Pairs of these specimens were placed in a mold 7 inches in diameter and suitable parting means were placed between said specimens to allow separation of prepared samples, whereafter a conventional neat hydraulic cement was displaced in the annulus formed by the exterior casing surface and the mold.

After the cement had cured for a period of time at the desired temperature, the sample to be tested was removed from the mold and the putty over the bore hole was substantially removed. Thereafter suitable means were connected to communicate hydraulic fluid through the hole to the simulated crack, hydraulic pressure was applied to the casing-cement interface and the hydraulic bond strength measured in terms of pressure in pounds per square inch necessary to part the cement from the casing.

The hydraulic bond strength data set forth in Table I was derived from specimen samples prepared in the manner set forth above, and under curing conditions of 120° F. for a period of 24 hours.

*Table I*

| | Surface Condition | Surface Coating | Hydraulic Bond Strength (p.s.i.) |
|---|---|---|---|
| 1 | New | None | <20 |
| 2 | do | do | <20 |
| 3 | Clean | do | 90 |
| 4 | do | do | 50 |
| 5 | do | Acid etched | 300 |
| 6 | do | do | 200 |
| 7 | do | Aluminized | 30 |
| 8 | do | do | 75 |
| 9 | do | Epoxy-sand | 500 |
| 10 | do | do | 480 |
| 11 | Rusty | None | 420 |
| 12 | do | do | 290 |
| 13 | do | Epoxy-sand | 650 |
| 14 | do | do | 420 |

From the foregoing it is apparent that samples 1 and 2 are entirely unsatisfactory; samples 3, 4, 7, and 8 exhibit improved strengths, but not in the order of the remaining samples.

EXAMPLE 2

The data from another group of samples are presented in Table II wherein the samples were prepared in essentially the same manner as those of Table I hereof. The variation in the preparation of samples for Table II was to subject a portion of the casing specimens, as noted in the table heading, to a thin coating of a conventional oil field mud to simulate actual environmental conditions * prior to displacing the cement thereabout.

---
*Although "actual environmental conditions" contemplate the presence of drilling mud, flushing agents have been and are being offered in the industry. These agents are applied prior to cementing to eliminate at least a portion of the drilling mud and thus aid in obtaining a good bond between the cement and the casing conduit.

---

Strengths were determined in the manner set forth above.

*Table II*

| | Surface Condition | Surface Coating | Environment | Hydraulic Bond Strength (p.s.i.) |
|---|---|---|---|---|
| 1 | Clean | Epoxy-sand | Dry | 500 |
| 2 | do | do | do | 480 |
| 3 | do | do | Mud film | 450 |
| 4 | do | do | do | 420 |
| 5 | do | Acid etched | Dry | 300 |
| 6 | do | do | do | 200 |
| 7 | do | do | Mud film | 60 |
| 8 | do | do | do | 50 |
| 9 | Rusty | None | Dry | 460 |
| 10 | do | do | do | 430 |
| 11 | do | do | Mud film | 40 |
| 12 | do | do | do | 20 |

The foregoing data indicates the improved results obtained by utilizing apparatus in accordance with the present invention, particularly in the comparison of the effect of environmental conditions. The presence of a mud film vastly reduces hydraulic bond strength of the casing not prepared in accordance with the present invention. The improved results are particularly outstanding with regard to samples 1 through 4 above.

EXAMPLE 3

The placement of casing conduit in a subterranean well bore inherently causes the cementing operation to be subject to certain conditions of temperature, pressure, etc. which are beyond practical control, however the time allowed for curing the cement can be controlled. Therefore data, presented in Table III, were accumulated from experiments to determine the possible effect of curing times upon the hydraulic bond strengths. Sample specimens of clean casing coated with epoxy resin and sand were prepared, as for Table I above, and cured for a constant temperature of 120° F. for the varied time periods noted.

*Table III*

| | Curing Time (Hours) | Hydraulic Bond Strength (p.s.i.) |
|---|---|---|
| 1 | 12 | 430 |
| 2 | 12 | 420 |
| 3 | 16 | 390 |
| 4 | 16 | 180 |
| 5 | 24 | 480 |
| 6 | 24 | 650 |
| 7 | 24 | 580 |
| 8 | 24 | 420 |
| 9 | 69 | 310 |
| 10 | 69 | 280 |

The curing period for a hydraulic cement must be in the order of 12 hours in order for the same to be cured sufficiently to withstand a perforating operation. From the foregoing, it is apparent that the minimum curing time for the perforating operation will also provide sufficient hydraulic bond strength to prevent normal cement failure at the interface of the cement and casing; so curing time is not considered to be a significant factor in achieving an adequate hydraulic bond.

Having described the article of manufacture used in the method of the invention, the following disclosure is directed to the method of completing a subterranean well bore utilizing the method as set forth hereinbelow. This method of well completion can be utilized in any well bore, but is particularly appropriate for those well bores wherein the casing conduit and cement sheath thereabout are subjected to the pressure of hydraulic fluid. In the conventional well completion operation of cementing casing in a well bore, the requisite length of casing meeting the physical conditions of the individual well situation is inserted into the well bore and means for emplacing the cement thereabout are arranged. The cement slurry is then placed in the annulus of the well bore and casing, either by dumping into the annulus or by pumping through the conduit upwardly around the same to the desired cement height. Subsequent to placing the cement slurry, the same is allowed to cure for a period from 8 to 48 hours at formation temperature. After the cement has cured, the variety of auxiliary completion operations involving opening a communication channel through the casing and cement sheath for movement of fluids under hydraulic pressure such as perforating, fracturing, acidizing, secondary recovery, and the like, can be accomplished.

The improvement of this invention over the conventional completion technique is to utilize a casing conduit as previously described herein, rather than conventional casing, in order to obtain an effective hydraulic bond between the conduit and cement. This can be accomplished by placing a string of conduit having a scabrous exterior from the surface to the complete depth to which the well bore is to be subjected to casing completion. This allows hydraulic pressure to be applied at any point from the surface to the bottom of the well bore without a failure of the cement job because of the improved bond between the conduit and cement.

In many instances, the depth of locations for prospective application of hydraulic pressures are sufficiently known to enable an alternate use of the treated conduit. Therefore, in well bores of fields wherein the geology of the formations are known, the treated conduit with scabrous exterior can be selectively spaced in the casing string to obtain placement of a section of treated conduit at the critical depths opposite formations to be subjected to further completion activity. This selective spacing of treated conduit can be achieved by treating only a portion of a conduit length or by placing a completely treated conduit length in a string as the same is being made up at the surface. Selective spacing of the scabrous conduit makes it possible to obtain adequate hydraulic bond strength at the intervals to be treated and has obvious economic advantage.

The article of this invention and method of completion utilizing the same were the subject of several field tests, conducted to confirm the information and data derived in the laboratory, which are set forth below as examples.

EXAMPLE 4

A well bore was drilled to 11 feet and 6 inches and conventional casing (4½ inches O.D.), brushed with epoxy resin and coated with 9–10 mesh sand, was inserted in the well bore. A cement slurry was pumped about the casing from the surface in the absence of a mud film environment, said cement being allowed to cure sufficiently for perforation. The casing and cement were perforated with a conventional 4-way jet gun at a depth of 9 feet. A hydraulic fluid [1] was pumped down the casing and through the perforation at a pressure of 125 to 200 p.s.i. until the slurry broke through to the surface. After the treatment an excavation was conducted about the simulated well to enable study of the condition of the casing and adjacent formation. The hydraulic pressure of the displaced slurry had severely cracked the cement about the casing up to a point 3 feet beneath the surface. Slurry had channeled upwardly through the cracks in the interface between the casing and cement to the point 3 feet from the surface to encounter adequate hydraulic bond which prevented further channeling or cement failure and caused the slurry to be displaced outwardly from the well bore casing to the surface in the adjacent area, indicating a good cement job.

EXAMPLE 5

A well bore was drilled to 11 feet and conventional casing (4½ inches O.D.), having a rusty surface, was inserted in the well bore, whereafter cement slurry was placed about the complete length of casing in the absence of a mud film environment. After sufficient curing for a perforation operation, the casing was perforated at a depth of 8½ feet with a conventional hydraulic jetting tool, and a hydraulic fluid [2] was pumped down the casing and through the perforations at about 50 p.s.i. pressure. The simulated well was excavated for study of the cement sheath which revealed no cracking of the cement or failure of the hydraulic bond, though hydraulic jetting sand was found in a small crack about 3 inches above the perforation.

EXAMPLE 6

A well bore was drilled to 11 feet and conventional casing (4½ inches O.D.), brushed with epoxy resin and coated with 9–10 mesh sand, was set to a depth of 9 feet 6 inches. A slurry cement was placed about the casing in the absence of a mud film environment which was allowed to cure sufficiently, leaving about 1½ feet of open hole completion. A hydraulic fluid [2] was pumped down the casing into the open section and 300 to 500 p.s.i. treating pressure was applied to the fluid until the same broke though at the surface at a distance from the well bore. The simulated well bore was excavated for stury of the cement sheath which revealed a small crack in the cement sheath at the bottom of the casing, but there was a good hydraulic bond to the surface with no channeling of the slurry upwardly between the casing and cement. The fluid breakthrough at the surface was through a fracture in the adjacent unconsolidated sand.

EXAMPLE 7

A well bore was drilled to 10 feet 6 inches and conventional casing (4½ inches O.D.), brushed with epoxy resin and coated with 9–10 mesh sand, was inserted in the well bore. A cement slurry was pumped about the casing from the surface in the absence of a mud film environment and allowed to cure sufficiently for good perforation. The casing and cement were perforated at a depth of 9 feet 3 inches with a conventional hydraulic jetting tool, and a hydraulic fluid [1] was pumped down the casing and through the perforation at approximately 50 p.s.i. pressure. The simulated well bore was excavated for study which revealed some cracking of the cement for 3 feet above the perforation. The upper 6 feet 3 inches of the casing had a good hydraulic bond, and there was no channeling except about the perforated section.

EXAMPLE 8

A well bore was drilled to 11 feet 6 inches and conventional 4½ inches O.D. casing having a rusty surface was inserted in the well bore, whereafter cement slurry was placed about the complete length of casing in the presence of a mud film environment. After sufficient curing for a perforating operation, the casing was perforated at a depth of 9 feet 6 inches with a conventional 4-way jet gun, and a hydraulic fluid [1] was pumped down the casing and through the perforations at a pressure of about 50 p.s.i. The simulated well was excavated and severe cracking of the casing-cement sheath to the surface was found. The hydraulic fluid was in the interface between the casing and cement from the point of perforation to the surface, indicating a complete lack of hydraulic bond strength and failure of the cement job.

Results of the above-described field tests confirm earlier laboratory data. Example No. 4 is a test wherein the casing was perforated with a jet gun and severe cracking of the cement sheath resulted. However, due to the good hydraulic bond the hydraulic fluid pumped through the perforations did not break the bond on the upper portion of the casing. Example No. 5 shows the results of a rusty surface with no mud film. The perforation

---

[1] A diesel oil slurry of plastic coated sand grains.
[2] A slurry of silicious consolidating agent material.

technique using a hydraulic jetting tool results in no cracking of the cement sheath and a good hydraulic bond obtained between the casing and the cement. Examples Nos. 6 and 7 both contained plastic coated casing with particulate solids. Example No. 6 was completed open hole while No. 7 was perforated with a hydraulic jetting tool. Both tests resulted in good hydraulic bonds between the casing and cement sheath. Example No. 8 exhibits the effect of the mud film on casing without a scabrous exterior surface. The casing in this test was rusty with a mud film on the exterior surface prior to cementing. The casing was also perforated with the jet gun, resulting in cracking of the cement sheath. Pumping a hydraulic fluid through the perforation resulted in breakthrough to the surface between the casing and cement. This correlates with previous laboratory data, as shown in Example 2, Table II, to show a very poor hydraulic bond between the casing and cement when a mud film is present on the casing surface.

While particular embodiments of the apparatus and method have been described, it will be understood that the invention is not limited thereto, since many modifications may be made; and it is, therefore, contemplated to cover by the appending claims any such modifications as fall within the true scope of the invention.

The invention, having thus been described, what is claimed and desired to be secured by Letters Patent is:

1. A method of cementing wells to obtain improved resistance to fluid leakage between conduits and cementitious material, said method comprising:
   lowering conduit means into a well bore, said conduit means having at least a peripherally encircling portion thereof continuously coated with matrix material with there being particulate material at least partially embedded within said matrix material and partially projecting therefrom; said portion of said conduit means upon which said matrix and particulate material are coated being resistive to abrasion while being lowered into said well bore;
   placing fluid, cementitious material in said well bore contiguous with at least a portion of said conduit means upon which said matrix and particulate material are coated; and allowing said fluid, cementitious material to harden within said well bore with the interface between said hardened, cementitious material and said matrix and particulate material coating being resistive to the passage of pressurized fluid.

2. A method of cementing wells to obtain improved resistance to fluid leakage between conduits and cementitious material, said method comprising:
   lowering conduit means into a well bore, said conduit means having at least a peripherally encircling portion thereof continuously coated with an adhesive material with there being particulate material at least partially embedded within said adhesive material and partially projecting therefrom, said adhesive material being hardened and rigidly embedding said particulate material;
   placing fluid, cementitious material in said well bore contiguous with at least a portion of said conduit means upon which said adhesive and particulate material are coated; and
   allowing said fluid, cementitious material to harden within said well bore with the interface between said hardened, cementitious material and said adhesive and particulate material coating being resistive to the passage of pressurized fluid.

3. The method of claim 2 in which said conduit means is first coated with said adhesive material and then said particulate material is applied to said coated surface.

4. The method of claim 3 in which the adhesive material is an epoxy resin and the particulate material is sand.

References Cited by the Examiner

UNITED STATES PATENTS

| | | | |
|---|---|---|---|
| 823,205 | 6/1906 | Coleman | 117—29 |
| 1,644,360 | 10/1927 | Talbot | 138—145 |
| 1,717,615 | 6/1929 | Millspaugh | 138—145 |
| 2,025,948 | 12/1935 | Jorgensen | 166—26 X |
| 2,849,417 | 8/1958 | Tsang | 156—330 X |
| 2,925,831 | 2/1960 | Welty et al. | 138—141 |
| 2,932,596 | 4/1960 | Rayner | 156—330 X |
| 3,012,487 | 12/1961 | Mika | 117—33 X |
| 3,059,697 | 10/1962 | Pitts | 166—49 |

FOREIGN PATENTS

| | | |
|---|---|---|
| 3,057 | 1869 | Great Britain. |

OTHER REFERENCES

Uren, Lester C.: Petroleum Production Engineering: Oil Field Development, N.Y., McGraw-Hill, 4th edition, 1956, pp. 454-459.

CHARLES E. O'CONNELL, *Primary Examiner.*

I. A. CALVERT, *Examiner.*

S. J. NOVOSAD, *Assistant Examiner.*